United States Patent
Takahashi (10) Patent No.: US 7,320,312 B2
(45) Date of Patent: Jan. 22, 2008

(54) FUEL INJECTION DEVICE FOR INTERNAL COMBUSTION ENGINE

(75) Inventor: Tomohiro Takahashi, Kariya (JP)

(73) Assignee: Denso Corporation, Kariya, Aichi-pref. (JP)

(*) Notice: Subject to any disclaimer, the term of this patent is extended or adjusted under 35 U.S.C. 154(b) by 64 days.

(21) Appl. No.: 11/421,159

(22) Filed: May 31, 2006

(65) Prior Publication Data
US 2006/0266334 A1    Nov. 30, 2006

(30) Foreign Application Priority Data
May 31, 2005    (JP)    ............................ 2006-158762

(51) Int. Cl.
    *F02M 57/02*    (2006.01)
(52) U.S. Cl. ..................................... 123/446
(58) Field of Classification Search ................ 123/446, 123/447, 457, 458
    See application file for complete search history.

(56) References Cited

U.S. PATENT DOCUMENTS

| | | | |
|---|---|---|---|
| 6,539,922 B2 * | 4/2003 | Sakai et al. | ................ 123/458 |
| 6,581,574 B1 * | 6/2003 | Moran et al. | ................ 123/497 |
| 6,990,958 B2 * | 1/2006 | Asano et al. | ................ 123/436 |
| 7,066,149 B1 * | 6/2006 | Date et al. | ................ 123/457 |
| 2001/0027775 A1 * | 10/2001 | Sakai et al. | ................ 123/457 |

FOREIGN PATENT DOCUMENTS

| | | |
|---|---|---|
| JP | 08-232703 | 9/1996 |
| JP | 2004-293540 | 10/2004 |

* cited by examiner

*Primary Examiner*—Thomas Moulis
(74) *Attorney, Agent, or Firm*—Nixon & Vanderhye P.C.

(57) ABSTRACT

A fuel injection device of an internal combustion engine executes tentative learning repeatedly while engine cooling water temperature increases. An actual learning value is renewed with the newest instrumental error learning value so that accuracy of the actual learning value is improved gradually. Thus, a variation of characteristics due to an instrumental error of a supply pump is absorbed as early as possible. In addition, accuracy of a tentative learning value obtained through the tentative learning is quickly brought close to the accuracy of the actual learning value obtained through main learning. As a result, a learning period at vehicle factory shipment is shortened and productivity at a vehicle factory is improved.

15 Claims, 3 Drawing Sheets

FUEL INJECTION DEVICE FOR INTERNAL COMBUSTION ENGINE

CROSS REFERENCE TO RELATED APPLICATION

This application is based on and incorporates herein by reference Japanese Patent Application No. 2005-158762 filed on May 31, 2005.

BACKGROUND OF THE INVENTION

1. Field of the Invention

The present invention relates to a fuel injection device for an internal combustion engine having a fuel supply pump that controls a fuel amount discharged to fuel injection valves mounted for respective cylinders of the engine. Specifically, the present invention relates to a pressure accumulation fuel injection device having a supply pump that meters a fuel suction amount with an electromagnetic valve to control a fuel discharge amount pressure-fed to a common rail.

2. Description of Related Art

A common rail fuel injection system known as a fuel injection system for a diesel engine has a common rail for accumulating high-pressure fuel which is distributed to multiple injectors mounted for respective cylinders of the engine. The high-pressure fuel is injected and supplied into a combustion chamber of each cylinder of the engine from the injector of the cylinder at predetermined timing. The high-pressure fuel is pressure-fed from a fuel supply pump, which can vary a discharge amount, to the common rail. The pressure-feeding amount (fuel discharge amount) is feedback-controlled. As such a fuel supply pump, there is a suction amount metering supply pump that determines the fuel discharge amount when the fuel is suctioned (for example, as described in JP-A-2004-293540).

The supply pump has an electromagnetic valve that controls a fuel suction amount suctioned into a pressurization chamber. For example, the electromagnetic valve controls a position of an inner valve with drive current applied to a solenoid coil to change an opening area (valve opening degree) of a fuel suction passage leading from a feed pump to the pressurization chamber, regulating the fuel suction amount. Thus, the fuel supply pump controls a fuel discharge amount discharged from the pressurization chamber to the common rail.

Figure 5:
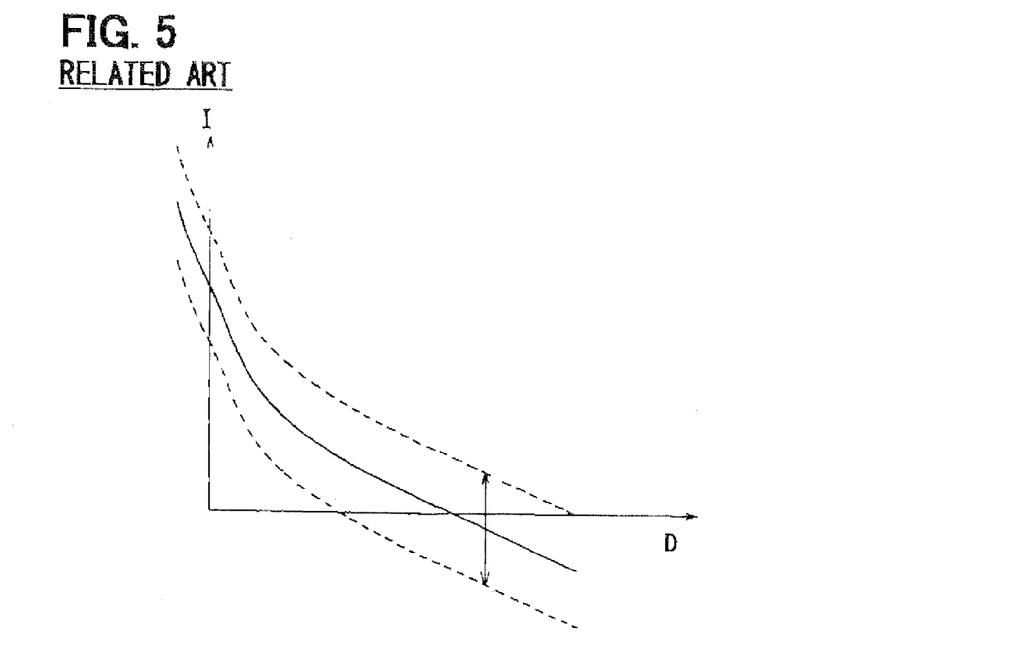
FIG. 5 is a characteristic diagram showing drive current/fuel discharge characteristics of a related art.

It is known that drive current/fuel discharge characteristics contain a large individual difference for each supply pump as shown by broken lines in FIG. 5. A solid line in FIG. 5 represents a standard characteristic (pump instrumental error median product characteristic). It is known that the fuel discharge amount D in an idling operation period varies so that the fuel discharge amount D is offset along a direction of current (drive current) I from the standard characteristic as shown by an arrow mark in FIG. 5. Therefore, a conventional technology performs learning control for learning and correcting a variation in characteristics due to an instrumental error of the supply pump by calculating a deviation in the direction of current I (current learning value) with respect to the standard characteristic in the idling operation period in which various engine conditions are stabilized.

Figure 6:
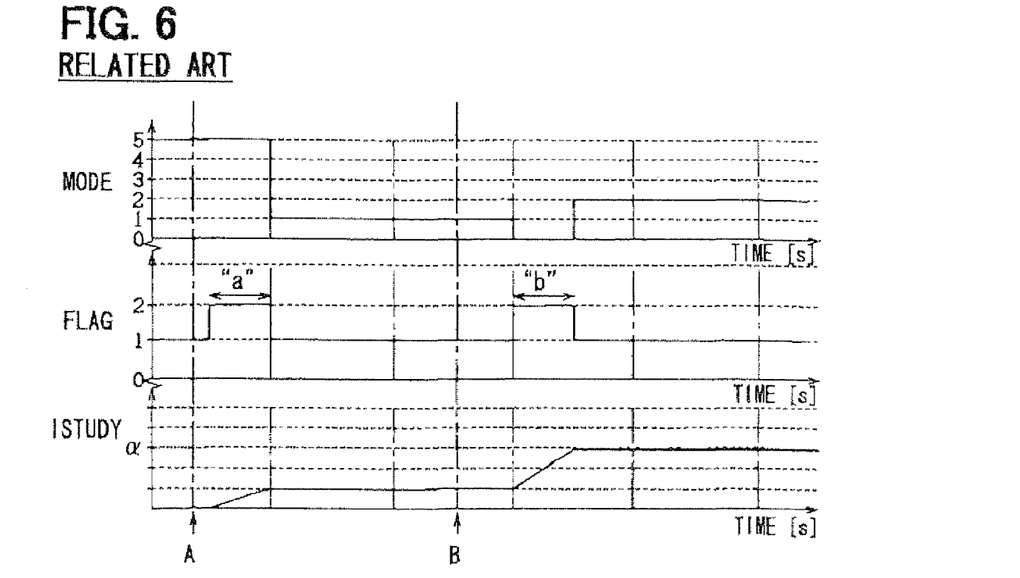
FIG. 6 is a time chart showing a pump instrumental error learning method of the related art.

In the case where the learning control is performed for the first time when a vehicle is shipped from a factory (at vehicle factory shipment), as shown in a time chart of FIG. 6, tentative learning is performed only once when engine cooling water temperature is low at the vehicle factory shipment, and then, main learning is performed only once when engine warm-up is completed. Values 5, 1, 0, 2 of a learning mode shown in FIG. 6 represent an initial state (initial state at factory shipment, for example), a tentative learning completion state, a learning state, and a main learning completion state respectively. Values 2, 1 of a learning flag in FIG. 6 represent learning execution and learning inexecution, respectively. A sign ISTUDY represents the actual learning value and $\alpha$ is a theoretical learning value. In FIG. 6, a condition for the tentative learning is satisfied at time A and the tentative learning is performed during an interval "a." A condition for the main learning is satisfied at time B and the main learning is performed during an interval "b."

The tentative learning is just a temporary pump instrumental error learning method and is performed to absorb the variation in the characteristics due to the instrumental error of the fuel supply pump as early as possible. The variation of the characteristics due to the instrumental error of the fuel supply pump can be absorbed by performing the tentative learning when the engine cooing water temperature is low. However, accuracy of a tentative learning value obtained through the tentative learning is lower than the accuracy of the actual learning value obtained through the main learning. For example, if the tentative learning is performed only once when the engine cooling water temperature is low in the case where the main learning is performed when the engine cooling water temperature is in a predetermined range, the tentative learning value obtained through the tentative learning differs largely from the actual learning value obtained through the main learning. Accordingly, the main learning is invariably necessary after performing the tentative learning.

However, a commercial car having a large heat capacity (for example, a vehicle equipped with a six-cylinder direct injection turbocharger four-cycle diesel engine) requires a long period for completing the engine warm-up (for example, it takes about 8 minutes for the engine cooling water temperature to increase from ordinary temperature to 65° C.). Therefore, if the main learning is performed for the first time at the vehicle factory shipment, it takes a long time to complete the main learning, deteriorating productivity at the factory.

In order to achieve at the same time early absorption of the variation of the characteristics due to the instrumental error of the fuel supply pump and improvement of the factory productivity through shortening of the learning period at the vehicle factory shipment, the tentative learning may be performed at the vehicle factory shipment and the main learning may be performed in the market after the vehicle factory shipment. In this case, the variation of the characteristics due to the instrumental error of the fuel supply pump is not absorbed thoroughly because the accuracy of the tentative learning value obtained through the tentative learning is low. If the engine test is continued in such a state a deviation between target common rail pressure and actual common rail pressure is continuously generated. For example, if the deviation between the target common rail pressure and the actual common rail pressure is continuously generated in an OBD-II (On Board Diagnostic system stage II) control subject car obliged to monitor a vehicular exhaust emission control condition with an in-vehicle computer, there is a possibility that the computer of the OBD-II system determines that the exhaust emission is deteriorated and turns on a warning lamp such as MIL (malfunction indicator lamp, engine check lamp) on a factory shipment liner stopping the factory shipment line.

SUMMARY OF THE INVENTION

It is an object of the present invention to provide a fuel injection device for an internal combustion engine capable of bringing accuracy of a tentative learning value obtained through tentative learning close to that of an actual learning value (instrumental error learning value) obtained through main learning. It is another object of the present invention to provide a fuel injection device for an internal combustion engine capable of achieving at the same time early absorption of an instrumental error variation of a fuel supply pump and improvement of productivity at a factory through shortening of a learning period at factory shipment and the like.

According to an aspect of the present invention, a fuel injection device of an internal combustion engine executes tentative learning for learning and correcting a variation of an instrumental error of a fuel supply pump before a learning execution condition is satisfied. The tentative learning is executed at least once after initial tentative learning is executed before a transition to main learning is made. Accuracy of the tentative learning value obtained through the tentative learning is improved as the main learning is approached after the initial tentative learning is executed. Thus, the accuracy of the tentative learning value obtained through the tentative learning is brought close to the accuracy of the actual learning value (instrumental learning value) obtained through the main learning as early as possible. Therefore, the internal combustion engine mounted with at least the fuel supply pump can be shipped without waiting for completion of the main learning at factory shipment, for example. Thus, the learning period at the factory shipment can be reduced. As a result, early absorption of an instrumental error variation of a fuel supply pump and improvement of productivity at a factory through shortening of a learning period at factory shipment and the like are achieved at the same time. The tentative learning may be executed repeatedly at least twice after the initial tentative learning is executed before the transition to the main learning is made.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Figure 1:
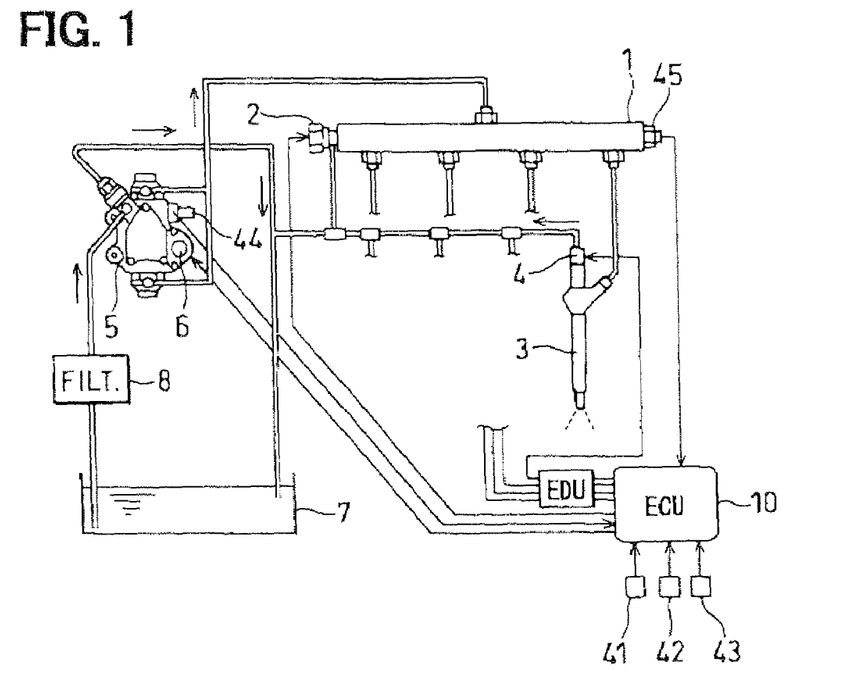
FIG. 1 is a schematic diagram showing a common rail fuel injection system according to an example embodiment of the present invention.

Referring to FIG. 1, a common rail fuel injection system according to an example embodiment of the present invention is illustrated. An engine control system according to the present embodiment has an exhaust emission purification device (not shown), a turbocharger (not shown), the common rail fuel injection system (pressure accumulation fuel injection device) and an engine control unit (engine controller, ECU) 10. The exhaust emission purification device purifies exhaust emission flowing out of combustion chambers of respective cylinders of an internal combustion engine such as a diesel engine (multi-cylinder diesel engine) mounted in a vehicle such as an automobile. The turbocharger supercharges intake air, which is auctioned into the combustion chambers of the cylinders of the engine, with the use of emission energy of the exhaust emission. The common rail fuel injection system injects and supplies high-pressure fuel into the combustion chambers of the cylinders. The ECU 10 electronically controls actuators of these systems.

The common rail fuel injection system injects and supplies the high-pressure fuel, which is accumulated in a common rail 1, into the combustion chambers of the cylinders of the engine through multiple (four, in this example) fuel injection valves (injectors) 3 mounted for the respective cylinders of the engine. The common rail fuel injection system has the common rail 1, the injectors 3 and a suction fuel metering fuel supply pump 5. The common rail 1 accumulates the fuel at high pressure corresponding to fuel injection pressure. The injector 3 injects and supplies the fuel into the combustion chamber of each cylinder of the engine at predetermined timing. The fuel supply pump 5 pressurizes the fuel suctioned into pressurization chambers through an electromagnetic valve 6. The ECU 10 has a function (learning controller) of learning and correcting a variation of characteristics due to an instrumental error of the supply pump 5 when a learning execution condition is satisfied. Only one injector 3 corresponding to one cylinder of the four-cylinder engine is shown but the other injectors 3 are not shown in FIG. 1.

The common rail 1 has a pressure reduction valve 2 capable of regulating an opening degree of a fuel discharge passage (fuel return passage) communicating with a fuel tank 7. Instead of the pressure reduction valve 2, a pressure limiter may be attached to the common rail 1. The pressure limiter limits the fuel pressure in the common rail to a limit set pressure or lower by opening when the fuel pressure in the common rail 1 exceeds the limit set pressure. The fuel injection from the injector 3 of each cylinder into the combustion chamber of the cylinder of the engine is electronically controlled by energization and de-energization (ON/OFF) of a coil (not shown) of an electromagnetic valve 4. The electromagnetic valve 4 controls increase and decrease of fuel pressure in a back pressure control chamber that controls operation of a command piston moving together with a nozzle needle.

The supply pump 5 is a high-pressure supply pump that has two or more pressure-feeding systems, i.e., two or more cylinders of pump elements, for pressurizing the suctioned low-pressure fuel. The single electromagnetic valve 6 controls a fuel discharge amount of all the pressure-feeding systems by metering a fuel suction amount suctioned into the respective pressurization chambers. The supply pump 5 has an already-known feed pump (low-pressure supply pump, not shown), a cam (not shown), two plungers P1, P2, the two pressurization chambers (plunger chambers, not shown), two suction valves (not shown) and two discharge valves (not shown). The feed pump draws up the low-pressure fuel from the fuel tank 7 when a pump drive shaft rotates in accordance with rotation of a crankshaft of the engine. The cam is driven and rotated by the pump drive shaft. Each one of the two plungers P1, P2 is driven by the cam to reciprocate between a top dead center and a bottom dead center. The two pressurization chambers pressurize the suctioned fuel to high pressure when the plungers P1, P2 reciprocate in a cylinder head (not shown) fixed to a pump housing 9. The suction valve closes if fuel pressure in the pressurization chamber increases to a predetermined value or over. The discharge valve opens if the fuel pressure in the pressurization chamber increases to a certain value or over.

The supply pump 5 pressurizes the low-pressure fuel, which is suctioned into the two pressurization chambers from the fuel tank 7 through a fuel supply pipe, to high pressure when the plungers P1, P2 reciprocate in the cylinder head (pump cylinder). A fuel filter 8 is located in the fuel supply pipe. The two suction valves are provided by check valves located upstream of the respective pressurization chambers with respect to a fuel flow direction, i.e., in a fuel suction passage leading from the feed pump to the two pressurization chambers through the single electromagnetic valve 6. The two discharge valves are provided by check valves located downstream of the respective pressurization chambers with respect to the fuel flow direction, i.e., in a fuel discharge passage leading from the pressurization chambers to a discharge port.

Figure 3:
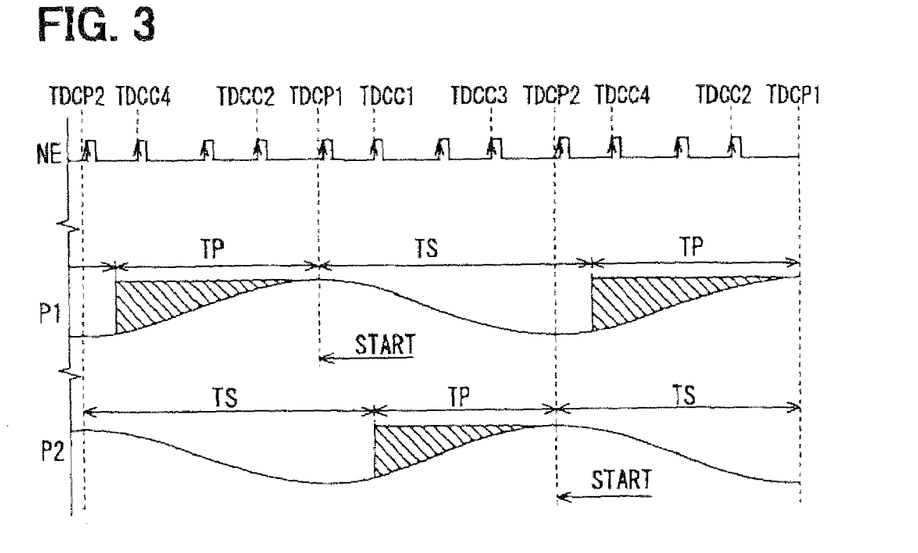
FIG. 3 is a time chart showing transitions of an NE signal pulse and positions of plungers of the supply pump according to the FIG. 1 embodiment.

The plungers P1, P2 are driven by the pump drive shaft that rotates in synchronization with the crankshaft of the engine. An interval in which each one of the plungers P1, P2 ascends from the bottom dead center to the top dead center is a pump discharge cycle. An interval in which each one of the plungers P1, P2 descends from the top dead center to the bottom dead center is a pump suction cycle. As shown in FIG. 3, an interval in which the suction valve is open, i.e., an interval in which each one of the plungers P1, P2 moves from the top dead center and passes the bottom dead center in the pump cylinder, is a pump suction period TS for suctioning the low-pressure fuel into the pressurization chamber. An interval in which the discharge valve is open, i.e., an interval in which each one of the plungers P1, P2 returns to the top dead center in the pump cylinder is a pump pressure-feeding period TP for pressure-feeding the high-pressure fuel pressurized in the pressurization chamber. In FIG. 3, signs P1 and P2 represent positions of the plungers P1, P2.

Figure 2:
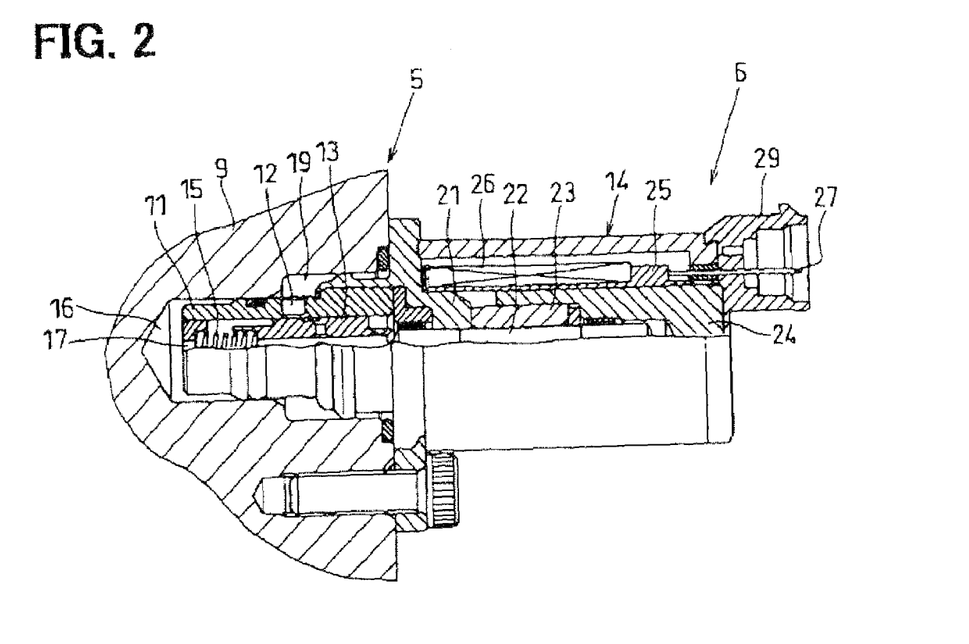
FIG. 2 is a sectional diagram showing an electromagnetic valve of a supply pump according to the FIG. 1 embodiment.

The electromagnetic valve (electromagnetic suction control valve: SCV) 6 is located in the fuel suction passage that is formed in the supply pump 5 and leads from the feed pump to the two pressurization chambers through the two suction valves. The electromagnetic valve 6 meters the fuel suction amount suctioned into the pressurization chambers. The electromagnetic valve 6 is a normally closed electromagnetic flow amount control valve (electromagnetic pump flow amount control valve, electromagnetic fuel suction amount control valve). The electromagnetic valve 6 is electronically controlled by SCV drive current applied by the ECU 10 through a pump drive circuit (not shown). Thus, the electromagnetic valve 6 regulates the suction amount of the fuel suctioned into the pressurization chambers of the supply pump 5.

The electromagnetic valve 6 has a sleeve-shaped valve case 11, a valve member (spool-shaped valve) 13, an electromagnetic drive section (solenoid section) 14, and a valve member biasing member 15 such as a coil spring. The valve case 11 is fixed to the pump housing 9 of the supply pump 5. The valve member 13 regulates an opening area of an inlet port 12 of the valve case 11. The electromagnetic drive section 14 drives the valve member 13 in a valve opening direction. The valve member biasing member 15 biases the valve member 13 in a valve closing direction. An outlet port 17 is formed in a left end of the valve case 11 in FIG. 2. The outlet port 17 opens into a communication passage 16 communicating with the pressurization chambers through the suction valves. The inlet port 12 communicates with a fuel sump 19 formed in the fuel suction passage leading from the feed pump to the two pressurization chambers through the two suction valves.

The electromagnetic drive section 14 has a stator core (fixed core) 21, a plunger 22, a cylindrical moving core (movable core) 23, a housing 24, a coil bobbin 25, a coil 26, a terminal 27, a connector 29 and the like. The stator core 21 is fixed to an outer periphery of a right section of the valve case 11 in FIG. 2 through a caulking process or the like. The plunger 22 reciprocates with the valve member 13 in the horizontal direction in FIG. 2. The moving core 23 is fixed to the outer periphery of the plunger 22. The moving core 23 is attracted toward the stator core 21 if the stator core 21 is magnetized. The housing 24 holds the plunger 22 and the moving core 23 so that the plunger 22 and the moving core 23 can reciprocate. The coil bobbin 25 is held on the outer periphery of the housing 24. The coil 26 is wound around the outer periphery of the coil bobbin 25. The terminal 27 is electrically connected to a terminal lead wire (not shown) of the coil 26. The connecter 29 holds the terminal 27. When energized, the coil 26 generates a magnetomotive force to magnetize the stator core 21 and to attract the plunger 22 and the moving core 23 in a stroke direction. The coil 26 is a solenoid coil consisting of a lead wire that is coated with an insulating coating and is wound around the coil bobbin 25 multiple times.

The electromagnetic valve 6 moves the valve member 13 in an axial direction relative to the inlet port 12, which opens in a radial direction of the valve case 11, in proportion to intensity of the SCV drive current applied to the coil 26 through the pump drive circuit. Thus, the electromagnetic valve 6 regulates the opening area of the inlet port 12 defining a part of the fuel suction passage. Thus, the fuel suction amount suctioned into the pressurization chambers from the feed pump through the fuel suction passage and the suction valves is regulated. Accordingly, the fuel discharge amount discharged from the pressurization chambers of the supply pump 5 into the common rail 1 is regulated to the optimum value corresponding to the operation condition of the engine. The fuel pressure in the common rail 1 corresponding to the injection pressure of the fuel injected from the injectors 3 into the combustion chambers of the respective cylinders of the engine, i.e., common rail pressure, is changed.

The ECU 10 has a microcomputer of a known structure. The microcomputer has functions of CPU for performing control processing and computation processing, a memory device (volatile memory such as SRAM or DRAM or nonvolatile memory such as EPROM, EEPROM or flash memory), an input circuit, an output circuit, a power source circuit and the like. If an ignition switch is turned on (IG-ON), the ECU 10 feedback-controls the fuel pressure in the common rail 1 (common rail pressure) to a control command value based on a control program or control logic stored in the memory.

An injector drive circuit (EDU) and the pump drive circuit are provided between the ECU 10 and actuators of the engine control system (common rail fuel injection system). The injector drive circuit applies INJ drive current to coils of the electromagnetic valves 4 mounted in the respective injectors 3. The pump drive circuit applies the SCV drive current to the coil 26 of the electromagnetic valve 6 of the supply pump 5. Sensor signals from various sensors such as a crank angle sensor 41, an accelerator position sensor 42, a cooling water temperature sensor 43, a fuel temperature sensor 44 and a common rail pressure sensor 45 are input to the microcomputer of the ECU 10 after A/D conversion of the sensor signals is executed at an A/D converter. A starter ON signal, a starter OFF signal, a battery voltage and the like are also input to the microcomputer. The cooling water temperature sensor 43 converts the engine cooling water temperature into an electric signal and outputs the electric signal. The fuel temperature sensor 44 converts temperature of the fuel suctioned into the supply pump 5 into an electric signal and outputs the electric signal. The cooling water temperature sensor 43 and the fuel temperature sensor 44 function as engine warm-up detectors for detecting completion of engine warm-up after the engine is started.

The crank angle sensor 41 is located to face an outer periphery of an NE timing rotor (not shown) attached to the crankshaft of the engine or the pump drive shaft of the supply pump 5. Multiple convex teeth are provided on the outer peripheral surface of the NE timing rotor at a predetermined angle interval. In the present embodiment, four convex teeth are provided at every predetermined crank angle (180° CA) for determining standard positions (top dead centers TDCC1, TDCC3, TDCC4, TDCC2) of the respective cylinders #1, #3, #4, #2 of the engine. In additions two convex teeth are located at every predetermined crank angle (360° CA) for determining suction start timing (START in FIG. 3) (top dead centers TDCP1, TDCP2 of the plungers P1, P2) of the supply pump 5. Transitions of the positions of the plungers P1 P2 shown in FIG. 3 take the shapes of similar waveforms for any cam profile or cam phase of the supply pump 5.

In the present embodiment, as shown in FIG. 3, the crank angle from the top dead center TDCP1 of the plunger P1 to the top dead center TDCP2 of the plunger P2 is the pump suction cycle of the plunger P1 and is the pump discharge cycle of the plunger P2. The crank angle from the top dead center TDCP2 of the plunger P2 to the top dead center TDCP1 of the plunger P1 is the pump discharge cycle of the plunger P1 and is the pump suction cycle of the plunger P2. The crank angle sensor 41 consists of an electromagnetic pickup. If the convex teeth of the NE timing rotor approach to and separate from the crank angle sensor 41, the crank angle sensor 41 outputs pulse-shaped rotational position signals (NE signal pulses: NE in FIG. 3) through electromagnetic induction. The NE signal pulses are output in synchronization with the rotation speed of the supply pump 5 (pump rotation speed). The ECU 10 functions as a rotation speed sensor for sensing the engine rotation speed (engine rotation number: NE) by measuring time intervals of the NE signal pulses output by the crank angle sensor 41.

The ECU 10 has a function (injection amount setting device) of calculating a command injection amount QFIN by adding an injection amount correction amount considering the engine cooling water temperature THW or the fuel temperature THF to a basic injection amount Q set in accordance with the engine rotation speed NE sensed by rotation speed sensing devices such as the crank angle sensor 41 and the accelerator position ACCP sensed by accelerator position sensing devices such as the accelerator position sensor 42. The ECU 10 has a function (injection timing setting device) of calculating command injection timing TFIN in accordance with the engine rotation speed NE and the command injection amount QFIN. The ECU 10 has a function (injection period setting device) of calculating injection command pulse length (command injection period) TQFIN corresponding to an energization period of the coils of the electromagnetic valves 4 of the respective injectors 3 in accordance with the actual common rail pressure PC sensed by fuel pressure sensing devices such as the common rail pressure sensor 45 and the command injection amount QFIN.

The ECU 10 has a function (fuel pressure controlling device) of calculating the optimum fuel injection pressure corresponding to the operation state of the engine and for driving the coil 26 of the electromagnetic valve 6 of the supply pump 5 through the pump drive circuit. The fuel pressure controlling device has a function (fuel pressure setting device) of calculating target common rail pressure PFIN from the engine rotation speed NE and the command injection amount QFIN. The fuel pressure controlling device feedback-controls the fuel discharge amount discharged from the pressurization chambers of the supply pump 5 by regulating the SCV drive current applied to the coil 26 of the electromagnetic valve 6 of the supply pump 5 to achieve the target common rail pressure PFIN.

Next, an example of a pump instrumental error learning method for learning and correcting a variation in drive current/fuel discharge characteristics due to the instrumental error of the supply pump 5 performed at the vehicle factory shipment will be explained in reference to FIGS. 1 to 4.

It is known that there is an individual difference (pump instrumental error) in the drive current/fuel discharge characteristics due to a manufacture variation in the opening shape of the inlet port 12 of the valve case 11 of the electromagnetic valve 6 of the supply pump 5 or a variation in the biasing force (spring force, spring load) of the valve member biasing member 15 such as the coil spring of the electromagnetic valve 6. Therefore, in the system of the present embodiment, as shown in the time chart of FIG. 4, the ECU 10 (tentative learning execution device) executes tentative learning for learning and correcting the variation in the characteristics due to the instrumental error of the supply pump 5 repeatedly twice or more if a learning execution condition A is satisfied continuously for a predetermined period in an initial state of the ECU 10 such as an initial state at factory shipment. The ECU 10 (main learning execution device) executes main learning for learning and correcting the variation in the characteristics due to the instrumental error of the supply pump 5 if a learning execution condition B is satisfied continuously for a predetermined period after the last tentative learning is executed.

Figure 4:
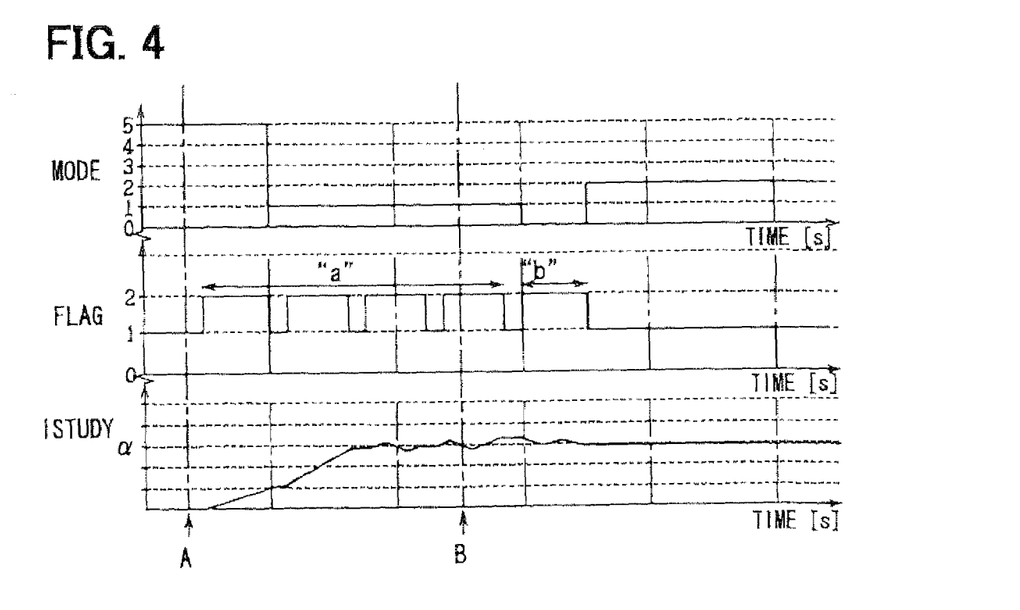
FIG. 4 is a time chart showing a pump instrumental error learning method according to the FIG. 1 embodiment.

In the case where engine shipment test (at least, factory shipment test of the common rail fuel injection system) is performed at the vehicle factory shipment, as shown in the time chart of FIG. 4, a learning execution flag (FLAG) is raised by pushing an existing switch connected to the ECU 10 for an extended time or by turning on a dedicated switch connected to the ECU 10. Alternatively, the learning execution flag may be raised if the ignition switch is turned on in the factory shipment initial state of the ECU 10. The learning execution flag may be raised to learn again the variation in the characteristics due to the instrumental error of the supply pump 5 at predetermined frequency when a condition of vehicle travel distance or the like is satisfied. The learning execution flag may be brought down when a predetermined period elapses after the main learning is completed.

When the learning execution condition A as the tentative learning execution condition is satisfied after the engine is started, the tentative learning is executed to absorb the variation of the characteristics due to the instrumental error of the supply pump 5 as early as possible. The learning execution condition A is satisfied when an idling operation in which engine conditions are stabilized occurs, i.e., when an idling stabilized state is detected. The learning execution condition A is satisfied (YES) when all of following conditions 1 to 9 are satisfied. The learning execution condition A is not satisfied (NO) when any one of the conditions 1 to 9 is not satisfied.

Condition 1: A deviation between the engine rotation speed NE and target idling rotation speed is equal to or lower than a predetermined value.

Condition 2: The engine rotation speed NE is within a predetermined range (for example, 800 to 1000 rpm).

Condition 3: The accelerator position ACCP is equal to or lower than a predetermined value (for example, 1%).

Condition 4: A pressure deviation $\Delta P$ between the actual common rail pressure PC and the target common rail pressure PFIN is equal to or lower than a predetermined value (for example 30 MPa).

Condition 5: The actual common rail pressure PC is within a predetermined range (for example, 30 to 40 MPa).

Condition 6: The command injection amount QFIN is within a predetermined range (for example, 1 to 5 mm$^3$/st).

Condition 7: There is no system abnormality such as fuel leakage or exhaust emission abnormality.

Condition 8: The starter is OFF.

Condition 9: The vehicle running speed (vehicle speed) is equal to or lower than a predetermined value (for example, 0 km/h).

The conditions 1 to 9 can be determined through the signals sent from various sensors or switches attached to the engine or the vehicle or through computation processing of the ECU 10. In the present embodiment, the ECU 10 starts counting of a timer (counter CN) when the learning execution conditions A is satisfied and performs the tentative learning when the counter CN reaches a predetermined value, i.e., when the learning execution condition A is satisfied continuously for a predetermined period, in the initial state such as the factory shipment initial state (MODE=5) of the ECU 10 as shown in FIG. 4. If the learning execution condition A becomes unsatisfied before the counter CN of the timer reaches the predetermined value, the counter CN of the timer is reset, and the counter ON is started over again when the learning execution condition A is satisfied again.

Next, a calculation processing method of a tentative learning value (instrumental error learning value: ISTUDY) obtained through the tentative learning will be explained. For example a feedback correction value (feedback pressure: PFB) is calculated first when the learning execution flag is ON and the engine start is completed. A proportional term is calculated by multiplying the pressure deviation $\Delta P$ between the actual common rail pressure PC and the target common rail pressure PFIN by a proportional gain GP as a feedback gain. Then, an integral term is calculated by multiplying an integration compensation amount, which is changed based on the pressure deviation $\Delta P$ between the actual common rail pressure PC and the target common rail pressure PFIN, by an integral gain GI as a feedback gain. Then, a derivative term is calculated by multiplying a time derivative value of the pressure deviation between the actual common rail pressure PC and the target common rail pressure PFIN by a derivative gain GD as a feedback gain. Then, the feedback pressure PFB is calculated by adding the proportional term, the integral term and the derivative term based on a following equation (1).

$$PFB = GP \times \Delta P + GI \times \int \Delta P + GD \times d/dt\, \Delta P \qquad (1)$$

Then, the feedback pressure PFB is converted into a feedback fuel discharge amount QFB with the use of a certain conversion coefficient. For example, by using a certain conversion coefficient K1, the feedback pressure PFB is converted into the feedback fuel discharge amount QFB necessary for a required discharge amount corresponding to the fuel injection amount QINJ, a fuel leak amount QLEAK and the target common rail pressure PFIN. For example, the feedback fuel discharge amount QFB may be calculated by multiplying the feedback pressure PFB by a value obtained by dividing a volumetric elastic coefficient $K\alpha$ by a common rail inner volume V.

Then, the required discharge amount is calculated (by required discharge amount determining device) in accordance with the fuel injection amount QINJ in a predetermined crank angle (for example, 360° CA), the fuel leak amount QLEAK in a predetermined crank angle (for example, 360° CA) and the target common rail pressure PFIN. The actual injection amount may be used as the fuel injection amount QINJ in the predetermined crank angle (for example, 360° CA). In the present embodiment, a value twice as large as the command injection amount (QFIN×2) is used as the fuel injection amount QINJ in the predetermined crank angle. Then, the target fuel discharge amount QPMP is calculated by adding the required discharge amount and the feedback fuel discharge amount QFB.

Then, the target fuel discharge amount QPMP is converted into a first required drive current I1 with the use of a certain conversion coefficient. For example, the target fuel discharge amount QPMP is converted into a suction command amount with the use of a two-dimensional map (not shown) using the target fuel discharge amount QPMP and the fuel pressure as parameters. Then, the suction command amount is converted into the first required drive current (target drive current) I1 with the use of a two-dimensional map (not shown) using the suction amount and the engine rotation speed NE as parameters.

Then, it is determined whether the learning execution condition A is satisfied. The learning execution condition A is satisfied (YES) when all of the conditions 1 to 9 are satisfied. The learning execution condition A is not satisfied (NO) when any one of the conditions 1 to 9 is not satisfied. The tentative learning is executed when the learning execution condition A is satisfied continuously for a predetermined period. First, a given idling operation fuel discharge amount (master product discharge amount) is taken from a nonvolatile memory such as EEPROM. The given idling operation fuel discharge amount is measured beforehand through experiment and the like. The idling operation fuel discharge amount is a value to be necessarily attained when a predetermined period elapses after the idling stabilized state is achieved, i.e., when the tentative learning is executed.

Then, the given idling operation fuel discharge amount is converted into a second required drive current I2 with the use of a certain conversion coefficient. For example, the given idling operation fuel discharge amount is converted into a suction command amount with the use of a two-dimensional map (not shown) using the given idling operation fuel discharge amount and the fuel pressure as parameters. Then, the suction command amount is converted into the second required drive current I2 with the use of a two-dimensional map (not shown) using the suction amount and the engine rotation speed NE as parameters.

Then, a value obtained by subtracting the second required drive current I2 from the first required drive current I1 is stored as a renewed actual learning value (tentative learning value, current learning value) ISTUDY in the nonvolatile memory such as the EEPROM. Then, the target drive current I1 and the actual learning value ISTUDY are added to calculate target drive current IPMP necessary for the target common rail pressure PFIN based on a following equation (2) (by learning value reflecting device). The learning value reflecting device assigns zero as an initial value of the actual learning value ISTUDY in the case where the ECU 10 remains in the factory shipment initial state.

$$IPMP=I1+ISTUDY \qquad (2)$$

As shown in FIG. 4, when the tentative learning for learning and correcting the variation of the characteristics due to the instrumental error of the supply pump 5 is executed before the learning execution condition B is satisfied at the vehicle factory shipment, the tentative learning is performed repeatedly at least twice after the initial tentative learning is executed before a transition to the main learning is made. Thus, a deviation (tentative learning value) along a direction of current with respect to the standard characteristics (pump instrumental error median product characteristics) is calculated before the main learning is executed, so the variation of the characteristics due to the instrumental error of the supply pump 5 is absorbed as early as possible.

The main learning is executed when the learning execution condition B as the main learning execution condition is satisfied after the tentative learning is executed. The learning execution condition B is satisfied (YES) when all of following conditions 10 to 12 are satisfied in addition to the learning execution condition A. The learning execution condition B is not satisfied (NO) when any one of conditions 1 to 12 is not satisfied.

Condition 10: The fuel temperature THF is within a predetermined range (for example, 40 to 70° C.).

Condition 11: The engine cooling water temperature THW is within a predetermined range (for example, 60 to 90° C.).

Condition 12: The battery voltage is within a predetermined range (for example, 24V or 12V).

The essential difference between the tentative learning execution condition A and the main learning execution condition B is to determine whether the engine warm-up is completed so that the learning accuracy is ensured when the engine operation state is the idling stabilized state. In the present embodiment, it is determined that the engine warm-up is completed when all of the conditions that the fuel temperature THF is within the corresponding predetermined range, that the engine cooling water temperature THW is within the corresponding predetermined range and that the battery voltage is within the corresponding predetermined range are satisfied. Alternatively, it may be determined that the engine warm-up is completed if at least one of the fuel temperature THF, the engine cooling water temperature THW and the battery voltage is within the corresponding predetermined range or if at least the engine cooling water temperature THW is within the corresponding predetermined range.

In the present embodiment, the timer counter CN is started when the learning execution condition B is satisfied and the tentative learning is completed, and the main learning is executed when the counter CN reaches a predetermined value, i.e., when the learning execution condition B is satisfied continuously for a predetermined period. Alternatively, the tentative learning may be interrupted and the timer counter CN may be started when the learning execution condition B is satisfied, and the main learning may be executed when the counter CN reaches a predetermined value, i.e., the learning execution condition B is satisfied continuously for a predetermined period. A calculation processing method of the actual learning value (instrumental error learning value) ISTUDY obtained through the main learning is similar to the calculation processing method of the tentative learning value (instrumental error learning valve) ISTUDY.

During the engine shipment test at the vehicle factory shipment, the engine cooling water temperature THW and the fuel temperature THF gradually increase since the initial tentative learning is executed until the transition to the main learning is made after the engine is started. Therefore, the engine control system of the present embodiment executes the tentative learning repeatedly in the period in which engine temperature such as the engine cooling water temperature THW or the fuel temperature THF increases until the completion of the engine warm-up, instead of ending the tentative learning after executing the tentative learning just once in a state in which the engine temperature such as the engine cooling water temperature THW or the fuel temperature THF is low. Thus, the actual learning value is renewed with the newest instrumental error learning value, gradually improving the accuracy of the actual learning value. The accuracy of the tentative learning value obtained through the tentative learning is improved as the main learning is approached after the initial tentative learning is executed. Thus, the variation of the characteristics due to the instrumental error of the supply pump 5 can be absorbed as early as possible. In addition, the accuracy of the tentative learning value obtained through the tentative learning can be quickly brought close to the actual learning value obtained through the main learning. Thus, even if the main learning is not completed at the vehicle factory shipment, it is not determined that the exhaust emission has deteriorated.

In order to achieve at the same time the early absorption of the variation of the characteristics due to the instrumental error of the supply pump 5 and the improvement of productivity at the vehicle factory through shortening of the learning period at the vehicle factory shipment, the tentative learning may be executed at the vehicle factory shipment and the main learning may be executed in the market after the vehicle factory shipment. Also in this case, for example, the computer of the OBD-II system of the OBD-II control subject car does not determine that the exhaust emission has deteriorated since the accuracy of the tentative learning value obtained through the tentative learning is improved in the present embodiment. Accordingly, stoppage of the factory shipment line due to turning on of the warning lamp such as the MIL can be avoided. The vehicle can be shipped without waiting until the main learning is completed so the learning period (engine test period) at the vehicle factory shipment and the like can be shortened. As a result, the early absorption of the variation of the characteristics due to the instrumental error of the supply pump 5 and the improvement of the productivity at the vehicle factory through the shortening of the learning period at the vehicle factory shipment can be achieved at the same time.

The actual learning value at the completion of the main learning may be used as the instrumental error learning value to be finally employed. Alternatively, the last actual learning value (tentative learning value) at the completion of the tentative learning may be used as the instrumental error learning value to be finally employed. Alternatively, an averaged value of the actual learning value at the completion of the main learning and the last several tentative learning values may be used. Further, an averaged value of the last several tentative learning values may be used.

In the above example embodiment, the internal combustion engine fuel injection device is applied to the common rail fuel injection system. The present invention may be applied to an internal combustion engine fuel injection device that has no accumulation vessel such as a common rail and supplies the high-pressure fuel from a fuel supply pump directly to fuel injection valves through high-pressure pipes.

In the above example embodiment, the electromagnetic valve 6 controls the fuel discharge amount discharged from the supply pump 5 by metering the fuel suction amount suctioned from the feed pump into the pressurization chambers in accordance with the SCV drive current. The electromagnetic valve 6 may be a normally closed electromagnetic flow amount control valve (electromagnetic pump flow amount control valve, electromagnetic fuel suction amount control valve) that is fully closed (valve hole opening area is minimized, lifting amount is minimized) when the coil 26 is de-energized. Alternatively, the electromagnetic valve 6 may be a normally open electromagnetic flow amount control valve (electromagnetic pump flow amount control valve, electromagnetic fuel suction amount control valve) that fully opens (valve hole opening area is maximized, lifting amount is maximized) when the coil 26 is de-energized.

In the above example embodiment, the supply pump 5 as the fuel supply pump has two or more cylinders of pump elements (pressure-feeding systems) for pressuring the suctioned low-pressure fuel and controls the fuel discharge amount of all the pressure-feeding systems by metering the fuel suction amount suctioned into the respective pressurization chambers with the single electromagnetic valve 6. Alternatively, a high-pressure supply pump that has two or more cylinders of pump elements (pressure-feeding systems) for pressurizing the suctioned low-pressure fuel and that controls the fuel discharge amount of the respective pressure-feeding systems by metering the fuel suction amount suctioned into the respective pressurization chambers with two or more electromagnetic valves 6 may be used as the fuel supply pump.

In the above example embodiment, at the factory shipment, the tentative learning for learning and correcting the variation of the instrumental error of the fuel supply pump is executed before the learning execution condition B is satisfied. Alternatively, the tentative learning for learning and correcting the variation of the instrumental error of the fuel supply pump before the learning execution condition B is satisfied may be executed at timing other than the factory shipment. If the tentative learning is executed repeatedly twice or more, there is a possibility that the data (actual learning value, instrumental error learning value) obtained through the main learning at the factory shipment or after market shipment (shipment to the market) are erased. The data obtained through the main learning can be erased when the ECU providing the learning controller is replaced or when the ECU is cut out from a power source, for example. Therefore, in addition to executing the tentative learning for learning and correcting the instrumental error variation of the fuel supply pump before the learning execution condition B is satisfied at the factory shipment, the tentative learning for learning and correcting the instrumental error variation of the fuel supply pump before the learning execution condition B is satisfied may be executed during maintenance, repair or replacement of the engine parts after the factory shipment or market shipment.

In the above example embodiment, the tentative learning is performed at least twice after the initial tentative learning before the main learning. The tentative learning may be performed at least once after the initial tentative learning before the main learning.

The present invention should not be limited to the disclosed embodiment, but may be implemented in many other ways without departing from the spirit of the invention.

What is claimed is:

1. A fuel injection device for an internal combustion engine, the fuel injection device comprising:
   a fuel supply pump for pressure-feeding high-pressure fuel to a fuel injection valve mounted in a cylinder of the engine; and
   a learning controller for executing main learning for learning and correcting a variation of an instrumental error of the fuel supply pump when a learning execution condition is satisfied, wherein
   the learning controller includes a tentative learning execution device that executes tentative learning for learning and correcting the variation of the instrumental error of the fuel supply pump before the learning execution condition is satisfied, and
   the tentative learning execution device executes the tentative learning at least once after initial tentative learning is executed before a transition to the main learning is made.

2. The fuel injection device as in claim 1, wherein the tentative learning execution device executes the tentative learning repeatedly at least twice after the initial tentative learning is executed before the transition to the main learning is made.

3. The fuel injection device as in claim 1, wherein the learning execution condition is satisfied when warm-up of the engine is completed after the engine is started.

4. The fuel injection device as in claim 1, wherein the learning controller has a learning value storing device that renews and stores a tentative learning value obtained through the tentative learning every time the tentative learning is executed.

5. The fuel injection device as in claim 1, wherein the learning controller has a learning value storing device that stores the last tentative learning value out of the tentative learning values obtained through the tentative learning as a final tentative learning value.

6. The fuel injection device as in claim 1, wherein the learning controller has a learning value storing device that stores an averaged value of the last multiple tentative learning values out of the tentative learning values obtained through the tentative learning as a final tentative learning value.

7. The fuel injection device as in claim 1, wherein the fuel supply pump pressurizes the fuel suctioned into a pressurization chamber and has an electromagnetic valve that meters a fuel suction amount suctioned into the pressurization chamber, the fuel supply pump structured so that a fuel discharge amount discharged by the fuel supply pump is changed in accordance with drive current supplied to the electromagnetic valve.

8. The fuel injection device as in claim 1, further comprising:
   a common rail that accumulates fuel at high pressure corresponding to fuel injection pressure, wherein
   the fuel supply pump pressurizes the fuel suctioned into a pressurization chamber and pressure-feeds the fuel to the common rail.

9. The fuel injection device as in claim 1, wherein
the fuel supply pump pressurizes the fuel suctioned into a pressurization chamber and has an electromagnetic valve that meters a fuel suction amount suctioned into the pressurization chamber,
the learning controller is incorporated in an engine control unit that controls a fuel discharge amount discharged from the fuel supply pump by regulating drive current supplied to the electromagnetic valve, and
the tentative learning is executed when a tentative learning execution condition is satisfied when the engine control unit is in an initial state.

10. A control method of a fuel injection device for an internal combustion engine, the control method comprising:
a tentative learning step of executing tentative learning for learning and correcting a variation of an instrumental error of a fuel supply pump that pressure-feeds high-pressure fuel to a fuel injection valve mounted in a cylinder of the engine before a learning execution condition is satisfied, and
a main learning step of executing main learning for learning and correcting the variation of the instrumental error of the fuel supply pump when the learning execution condition is satisfied, wherein
the tentative learning step executes the tentative learning at least twice before a transition to the main learning is made.

11. The control method as in claim 10, wherein
the tentative learning step executes the tentative learning at least three times before the transition to the main learning is made.

12. The control method as in claim 10, wherein
the learning execution condition is satisfied when warm-up of the engine is completed after the engine is started.

13. The control method as in claim 10, further comprising:
a storing step of storing a tentative learning value obtained through the tentative learning as a renewed tentative learning value every time the tentative learning is executed.

14. The control method as in claim 10, further comprising:
a storing step of storing the last tentative learning value out of the tentative learning values obtained through the tentative learning as a final tentative learning value.

15. The control method as in claim 10, further comprising:
a storing step of storing an averaged value of the last multiple tentative learning values out of the tentative learning values obtained through the tentative learning as a final tentative learning value.

* * * * *

UNITED STATES PATENT AND TRADEMARK OFFICE
CERTIFICATE OF CORRECTION

PATENT NO. : 7,320,312 B2  
APPLICATION NO. : 11/421159  
DATED : January 22, 2008  
INVENTOR(S) : Takahashi Page 1 of 1

It is certified that error appears in the above-identified patent and that said Letters Patent is hereby corrected as shown below:

Title Page; item (30);

Please correct Front Page of Patent, Foreign Application Priority Data section as shown below:

Please correct the date "2006-158762" to read:

--2005-158762--

Signed and Sealed this

Thirteenth Day of May, 2008

JON W. DUDAS  
*Director of the United States Patent and Trademark Office*